Oct. 4, 1955
J. B. CHALLEN
2,719,434
FRICTION DRIVE SCREW PRESSES
Filed Aug. 8, 1952
2 Sheets-Sheet 2
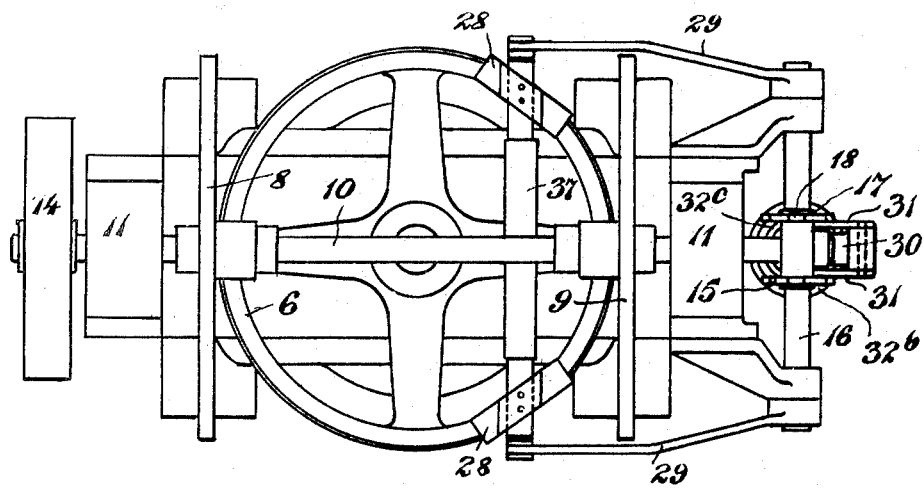
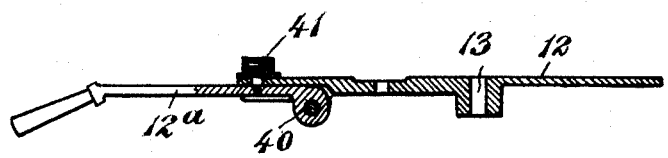
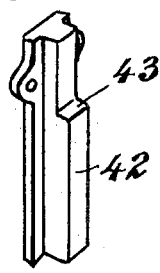
INVENTOR
JOHN BERNARD CHALLEN
BY
ATTORNEYS

United States Patent Office 2,719,434
Patented Oct. 4, 1955

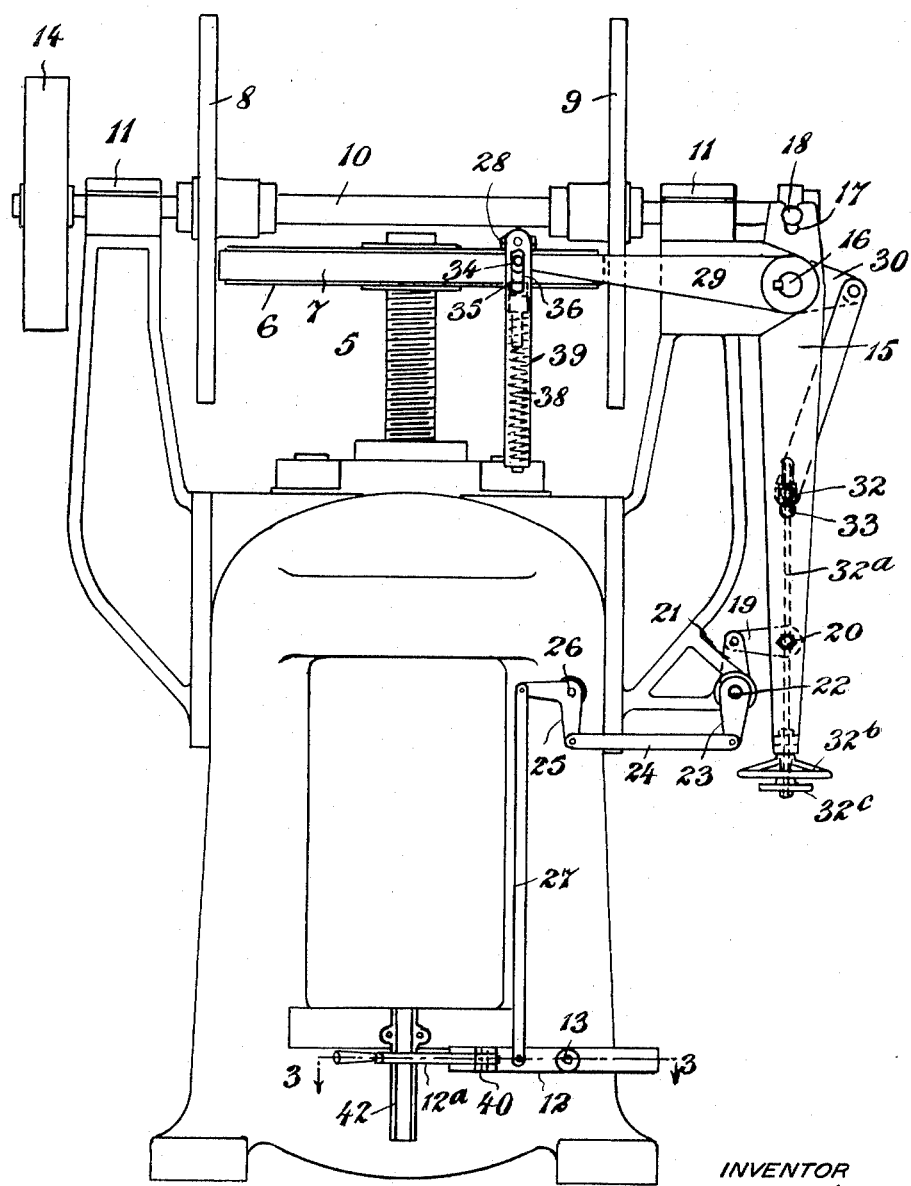

2,719,434
FRICTION DRIVE SCREW PRESSES

John Bernard Challen, Birmingham, England, assignor to Taylor & Challen Limited, Constitution Hill, Birmingham, England, a British company Application August 8, 1952, Serial No. 303,246

4 Claims. (Cl. 74—202)

This invention relates to improvements in friction drive screw presses of the kind in which the screw, which is normally vertically mounted, is connected to a flywheel which is adapted to be driven by peripheral frictional contact with the face of either one of two friction discs mounted upon a common axially slidable shaft and wherein the shaft is adapted to be moved so as to clutch the friction disc for the downward or operational stroke to the flywheel by means of a biased hand lever which, when released, admits of the shaft moving automatically to clutch the other friction disc to the flywheel so as to reverse the stroke of the press until the flywheel contacts brake shoes carried by arms connected to the clutch operating mechanism and thereby disengage the drive for the upward or reverse stroke.

In such presses it has been found that when the flywheel strikes the brake shoes the shaft is moved axially against the action of the bias of the clutch lever sufficiently to engage the friction disc for downward or operational stroke with the flywheel whereafter the bias of the clutch lever again becomes operative and the other friction disc is engaged with the flywheel. This alternating engagement of the two friction discs with the flywheel continues until the flywheel usually comes to rest below the top of the stroke of the press with the friction disc for upward travel of the screw resting gently against the periphery of the flywheel thereby causing unnecessary wear of the friction head thereof and preventing the brake shoes from performing their proper function.

The object of the present invention is to overcome this disadvantage by providing means whereby a neutral position is achieved after the flywheel has struck the brake shoes and permit the brake shoes to carry out their function of keeping the flywheel from being traversed downwardly.

The invention consists of a friction drive screw press of the kind referred to characterised by the provision of a resilient coupling between the brake shoes and the clutch engaging mechanism of the press and the provision of catch mechanism associated with the hand lever or its linkage which catch mechanism must be manually released before the friction disc for the downward or operational stroke of the press can be engaged with the flywheel.

A convenient embodiment of the present invention will now be described by way of example with particular reference to the accompanying drawings in which:

Fig. 1 is a front elevation of the press in accordance with the present invention.

Fig. 2 is a plan of the press seen in Fig. 1.

Fig. 3 is a section on the line 3—3 of Fig. 1 and

Fig. 4 is a perspective view of the catch which is connected to the frame of the press.

The press mainly follows normal practice and incorporates a vertically disposed screw 5 to the upper end of which is secured a flywheel 6 the periphery whereof is furnished with a friction tread 7 which is adapted to be engaged by the face of either one of two friction discs 8 or 9 mounted on opposite sides of the flywheel 6 on a common horizontal shaft 10. This shaft 10 is axially slidable in bearings 11 in the frame of the press under the control of a linkage operated by a hand lever 12 which is biased in an upward direction about a fixed pivot 13 on the frame of the press. The shaft 10 is adapted to be positively driven through a pulley 14 from any convenient source such as an electric motor bolted to the frame of the press and the linkage referred to comprises a double lever 15 freely rotatable about a shaft 16 and having a bifurcated upper end slotted at 17 to engage trunnions 18 on the shaft 10, a link 19 pivotally connected to the lever 15 at 20 and at its other end to the radial arm 21 on a spindle 22, a second radial arm 23 on the spindle 22 connected by the link 24 to the one arm of a bellcrank lever 25 pivoted on the frame of the press at 26 and a link 27 connecting the other arm of the bellcrank lever 25 to the hand lever 12. When the hand lever 12 is in its fully raised position (i. e. is rotated about the pivot 13 in a clockwise direction as viewed in Fig. 1 to the limit of its travel) the friction disc 9 for raising the screw is in engagement with the periphery of the flywheel 6, whilst when the hand lever is at the downward limit of its travel the friction disc 8 for driving the screw downwards is in engagement with the periphery of the flywheel 6 and sufficient clearance is provided between the two discs 8 and 9 and the periphery of the flywheel 6 to admit of a neutral position being obtained in which both discs are out of contact with the flywheel as shown in Fig. 1.

Above the flywheel 6 are a pair of brake shoes 28 which are adapted to be contacted by the flywheel during the final portion of the upward travel of the screw. These brake shoes 28 are carried by levers 29 fixedly mounted on the rotatable shaft 16 which also carries a fixed radial arm 30 which is connected to a double link 31 which is in turn connected to the lever 15 by a crossbar 32 which can be adjusted by a vertical screw 32ª to any desired setting within the slots 33 in the double lever 15 by the hand wheel 32ᵇ associated with a locking wheel 32ᶜ.

It is to be understood that contact of the flywheel 6 with the brake shoes 28 raises the brake shoes so as to turn the lever 29 and shaft 16 and thereby disengage the friction disc 9 for upward travel of the screw from the flywheel, the point of contact of the brake shoes 28 with the flywheel 6 being determined by the setting of the crossbar 32 in the slots 33. The mechanism so far described is known practice and with such mechanism there is a tendency for the flywheel 6 to strike the brake shoes 28 with such force that the lever 15 is rocked over the central position shown in Fig. 1 so that the friction disc 8 is engaged with the flywheel 6 for a short space of time whereafter the bias of the lever 12 becomes operative resulting in an alternating engagement of the two friction discs 8 and 9 with the flywheel until the flywheel usually comes to rest below the top of its stroke thereby preventing the brake shoes from performing their proper function.

According to the present invention the levers 29 carry lateral pins 34 which engage within slots 35 in blocks 36 connected to the crossbar 37 carrying the brake blocks 28 and these pins 34 are normally maintained at the upward limit of their travel by means of coil compression springs 38 located within tubular housings 39 secured to the blocks 36.

From the foregoing it will be understood that a lost motion is permitted between the brake blocks 28 and the levers 29 against the action of the springs 38 when the brake blocks are struck by the flywheel 6.

Also in accordance with the present invention the hand lever 12 is formed in two pivotally interconnected parts (see Fig. 3) the pivotal connection 40 being on a vertical axis and at right angles to the fixed pivot 13. The pivotal interconnection of the two parts incorporates a spring loading 41 whereby the two parts are normally held in substantial alignment but which will admit of the part 12ª constituting the free end of the lever being removed away from the frame of the press against the action of the spring 41. The part 12ª of the lever 12 is adapted to co-operate with a catch 42 on the frame of the press which catch is provided with a step 43 which prevents the lever moving downwards from a neutral position to engage the friction disc 8 with the flywheel 6 before the part 12ª of the lever has been moved outwardly from the press against the action of the spring 41 to disengage it from the step 43.

In operation when the part 12ª of the lever 12 has been released from the step 43 and moved downwardly the friction disc 8 for downward travel of the screw 5 engages with the flywheel 6 and the screw moves downward to the limit of its travel in known manner. When the hand lever 12 is released the bias comes into operation and raises the part 12ª of the lever past the step 43 so as to engage the other friction disc 9 with the flywheel and the screw 5 is traversed upwardly until the flywheel 6 strikes the brake shoes 28. The friction disc 9 is now disengaged from the flywheel and the free end of the hand lever is forced downwardly against the action of its bias. However, this downward movement of the hand lever is limited by the step 43 which prevents the lever descending to an extent sufficient to admit of the friction disc 8 for downward travel of the screw engaging the flywheel. Since the hand lever 12 is restricted in its downward movement the levers 29 are restricted in their upward travel with the result that the spring loadings 38 are compressed and the flywheel 6 is brought to rest in a neutral position in which it is out of contact with both friction discs.

I claim:

1. In a friction drive screw press having a frame with a screw threaded therein, said screw carrying a wheel positioned between parallel coaxial friction discs, said wheel having a friction tread engageable by either of said discs to move said wheel perpendicularly with respect to the axis of said discs, there being manually operable shift mechanism movable in opposite directions for engaging or disengaging either of said discs with said tread, the combination with said shift mechanism of a brake engageable by said wheel as it approaches the axis of said discs, means connecting said brake to said mechanism to disengage said tread and the disc which turns the wheel in the direction that moves the wheel toward the axis of said discs, and a catch for preventing said mechanism from moving sufficiently to shift the disc which turns said wheel in a direction that moves said wheel away from the axis of said discs, whereby oscillation of said mechanism is prevented.

2. In a friction drive screw press having a frame with a screw threaded therein, said screw carrying a wheel positioned between parallel coaxial friction discs, said wheel having a friction tread engageable by either of said discs to move said wheel perpendicularly with respect to the axis of said discs, there being manually operable shift mechanism movable in opposite directions for engaging or disengaging either of said discs with said tread, the combination with said shift mechanism of a brake engageable by said wheel as it approaches the axis of said discs, means connecting said brake to said mechanism to disengage said tread and the disc which turns the wheel in the direction that moves the wheel toward the axis of said discs, a catch for preventing said mechanism from moving sufficiently to shift the disc which turns said wheel in a direction that moves said wheel away from the axis of said discs, and means to permit said brake to yield under continued movement of said wheel after said catch has prevented further movement of said shift mechanism.

3. In a friction drive screw press having a frame with a screw threaded therein, said screw carrying a wheel positioned between parallel coaxial friction discs, said wheel having a friction tread engageable by either of said discs to move said wheel perpendicularly with respect to the axis of said discs, there being manually operable shift mechanism movable in opposite directions for engaging or disengaging either of said discs with said tread, the combination with said shift mechanism of a brake engageable by said wheel as it approaches the axis of said discs, means connecting said brake to said mechanism to disengage said tread and the disc which turns the wheel in the direction that moves the wheel toward the axis of said discs, a catch for preventing said mechanism from moving sufficiently to shift the disc which turns said wheel in a direction that moves said wheel away from the axis of said discs, a handle for said shift mechanism, and means whereby said catch may be released by appropriate manipulation of said handle.

4. In a friction drive screw press having a frame with a screw threaded therein, said screw carrying a wheel positioned between parallel coaxial friction discs, said wheel having a friction tread engageable by either of said discs to move said wheel perpendicularly with respect to the axis of said discs, there being manually operable shift mechanism movable in opposite directions for engaging or disengaging either of said discs with said tread, the combination with said shift mechanism of a brake engageable by said wheel as it approaches the axis of said discs, means connecting said brake to said mechanism to disengage said tread and the disc which turns the wheel in the direction that moves the wheel toward the axis of said discs, a catch for preventing said mechanism from moving sufficiently to shift the disc which turns said wheel in a direction that moves said wheel away from the axis of said discs, a handle for said shift mechanism, and means whereby said catch may be released by appropriate manipulation of said handle.

References Cited in the file of this patent

UNITED STATES PATENTS

| | | |
|---|---|---|
| 1,324,095 | Zeh | Dec. 9, 1919 |
| 1,553,243 | Ivens | Sept. 8, 1925 |